(12) United States Patent
Leverett et al.

(10) Patent No.: US 7,509,329 B1
(45) Date of Patent: Mar. 24, 2009

(54) TECHNIQUE FOR ACCELERATING FILE DELETION BY PRELOADING INDIRECT BLOCKS

(75) Inventors: Bruce W. Leverett, Pittsburgh, PA (US); Mandayam C. Srivas, Henderson, NV (US)

(73) Assignee: Network Appliance, Inc., Sunnyvale, CA (US)

( * ) Notice: Subject to any disclaimer, the term of this patent is extended or adjusted under 35 U.S.C. 154(b) by 422 days.

(21) Appl. No.: 10/858,492

(22) Filed: Jun. 1, 2004

(51) Int. Cl.
*G06F 13/00* (2006.01)
(52) U.S. Cl. .......................... 707/101; 707/102; 707/2; 707/3; 707/205; 707/206; 711/170; 711/137; 711/118; 712/237
(58) Field of Classification Search ................. 711/137, 711/122, 118, 170; 712/237; 707/102, 205, 707/206, 101, 2, 3
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,989,206 A | 1/1991 | Dunphy, Jr. et al. | |
| 5,124,987 A | 6/1992 | Milligan et al. | |
| RE34,100 E | 10/1992 | Hartness | |
| 5,155,835 A | 10/1992 | Belsan | |
| 5,239,644 A * | 8/1993 | Seki et al. ..................... 710/52 |
| 5,426,747 A | 6/1995 | Weinreb et al. | |
| 5,581,724 A | 12/1996 | Belsan et al. | |
| 5,996,047 A * | 11/1999 | Peacock ..................... 711/118 |
| 6,003,115 A * | 12/1999 | Spear et al. ................. 711/137 |
| 6,098,096 A * | 8/2000 | Tsirigotis et al. ............ 709/213 |
| 6,289,356 B1 * | 9/2001 | Hitz et al. ................... 707/201 |
| 6,397,311 B1 * | 5/2002 | Capps ........................ 711/165 |

(Continued)

FOREIGN PATENT DOCUMENTS

WO WO 89/10594 11/1989

OTHER PUBLICATIONS

Administration Guide found at http://www.openafs.org/pages/doc/AdminGuide/auagd010.htm, visited on Mar. 2, 2005.

(Continued)

*Primary Examiner*—Hong Kim
(74) *Attorney, Agent, or Firm*—Cesari and McKenna, LLP

(57) ABSTRACT

A system and method for accelerating file deletion by preloading indirect blocks. When processing level 1 (L1) indirect blocks, the file server issues a read request for the next N indirect blocks to be loaded into a buffer cache. The file server processes the indirect blocks from the buffer cache without requiring multiple single block disk accesses. Once the N indirect blocks have been processed, a read request for the next N L1 indirect blocks is then sent. The technique permits parallel processing by loading indirect blocks to be processed while previously cached indirect blocks are being processed.

10 Claims, 11 Drawing Sheets

U.S. PATENT DOCUMENTS

| | | | |
|---|---|---|---|
| 6,463,509 | B1 * | 10/2002 | Teoman et al. ............... 711/137 |
| 6,636,879 | B1 | 10/2003 | Doucette et al. |
| 2001/0021959 | A1 * | 9/2001 | Holmberg et al. ........... 711/104 |
| 2002/0116593 | A1 | 8/2002 | Kazar et al. |
| 2003/0182317 | A1 * | 9/2003 | Kahn et al. ................. 707/200 |
| 2006/0129766 | A1 * | 6/2006 | Cassia et al. ................ 711/137 |

OTHER PUBLICATIONS

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14th VLDB Conference, LA, CA (1988).

Blasgen, M.W. et al., *System R:An architectural Overview*,Reprinted from IBM Systems Journal vol. 20, No. 1, 1981 © 1981, 1999.

Borenstein, Nathaniel S., *CMU's Andrew project a retrospective*, Communications of ACM, 39(12), Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System/400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al., *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

*The IBM System/38*, Chapter 8, pp. 137-15.

Isomaki, Markus, *Diferentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1: 91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan, L., et al., *RAMA:A File System for Massively Parallel Computers*, 12th IEEE Symposium on Mass Storage Systems, Monterey, CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective On The Sprite Network Operating System*, found at http://www.cs.berkeley.edu/projects/sprite/retrospective,html, visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, *The Design and Implementation of a Log-Structured File System* Jul. 24, 1991, pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and Implementation of the Sun Network Filesystem.* In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

U.S. Appl. No. 10/777,979, filed Feb. 12, 2004, Eng et al.

* cited by examiner

TECHNIQUE FOR ACCELERATING FILE DELETION BY PRELOADING INDIRECT BLOCKS

FIELD OF THE INVENTION

The present invention is directed to deleting files in a file system and, in particular to accelerating file deletion by preloading indirect blocks.

BACKGROUND OF THE INVENTION

A storage system is a computer that provides storage service relating to the organization of information on storage devices, such as disks. The storage system may be deployed within a network attached storage (NAS) environment and, as such, may be embodied as a file server. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not over-write data on disks. If a data block on disk is retrieved (read) from disk into memory and "dirtied" with new data, the data is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the SpinFS file system available from Network Appliance, Inc. of Sunnyvale, Calif. The SpinFS file system utilizes a write anywhere technique for user and directory data but writes metadata in place. The SpinFS file system is implemented within a storage operating system having a protocol stack and associated disk storage.

When accessing a block of a file in response to servicing a client request, the file system retrieves the requested block from disk and stores it in a buffer cache of the memory as part of a buffer tree of the file. The buffer tree is an internal representation of blocks of a file stored in the buffer cache and maintained by the file system. Broadly stated, the buffer tree has an inode at the root (top-level) of the file. For a large file, the inode contains pointers that may reference high-level (e.g. level 2, L2) indirect blocks, which blocks may also contain pointers that reference low-level (e.g., level 1, L1) indirect blocks. The L1 indirect blocks, in turn, contain pointers that reference the actual data blocks of the file.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. As described herein, a volume typically comprises at least one data disk and one associated parity disk (or possibly data/parity partitions in a single disk) arranged according to a RAID 4, or equivalent high-reliability, implementation.

The write anywhere file system typically includes a storage allocator that performs write allocation of blocks in a volume in response to an event in the file system (e.g., dirtying of the blocks in a file). The storage allocator uses block allocation structures, such as an allocation bitmap, to select free blocks within its storage space to which to write the dirty blocks. Each bit in the allocation bitmap structure corresponds to a block in the volume; freeing a block involves clearing of the corresponding bit in the allocation bitmap, whereas selecting (allocating) a block involves setting the corresponding bit. The allocated blocks are generally in the same positions along the disks for each RAID group (i.e., within a stripe) so as to optimize use of the parity disks.

A noted advantage of write anywhere file systems is that write operations directed to many files can be collected and later committed to disk in a batch operation, thereby increasing system performance by writing large blocks of contiguous data to disk at once. The optimized write performance of the write anywhere file system may result in the dirtied data of the files being stored in new locations separate and apart from the originally stored data of the files. Accordingly, the blocks of a file may be scattered among the disks of the volume. This results in a noted disadvantage of write anywhere file systems, namely, the latencies involved with (slowness of) file deletion, especially of a large (i.e., multi-megabyte) file.

During a file deletion operation, the buffer tree of the file is loaded from disk. Given the scattered nature of the file, loading of indirect blocks of the file typically occurs serially (i.e., one indirect block at a time) from disk, which results in numerous single block disk access requests. If the indirect block is a low-level (L1) indirect block, i.e., one that directly points to (references) data, the storage allocator serially (one at a time) clears the bit in the allocation bitmap corresponding to the data block referenced by each pointer in the block, and then clears the allocation bit corresponding to the L1 block. If the indirect block is a high level (L2) indirect block) then each L1 indirect block referenced by a pointer in the L2 block must be loaded (serially) for processing as described above. As a result, many single block disk access requests are generated during file deletion, which adversely affects (slows) system performance.

One technique for improving file deletion performance is to immediately remove the file from its directory, thereby making it "invisible" (inaccessible) to a user of the file system. Individual blocks of the file may then be asynchronously deleted at a later time using, e.g., a "lazy-write" technique of processing indirect blocks (as described above) when there is free processing time or available disk access bandwidth. However, this technique does not eliminate the substantial time required to individually load each indirect block for processing. That is, the storage allocator must still work its way down (traverse) the buffer tree of the file, retrieving a first high level (L2) block, reading a first pointer of the L2 block and retrieving its referenced low level (L1) block, and serially freeing each data block referenced by the pointers of the L1 block. The storage allocator then reads a second pointer of the L2 block, retrieves its referenced L1 block and processes that block as described above. This process continues in a manner that spreads the numerous single block access requests over a longer period of time, which generates an increased load over a longer period of time.

SUMMARY OF THE INVENTION

The disadvantages of the prior art are overcome by a novel technique that accelerates file deletion by preloading indirect blocks of a large file served by a storage system. In particular, the technique accelerates traversal of a buffer tree of the file during a file deletion operation by preloading a predefined number (N) of low level (L1) indirect blocks referenced by a high level (L2) indirect block into a buffer cache of the storage system before those L1 blocks are needed for processing. The value of N is chosen to ensure that all preloaded indirect blocks may be stored in the buffer without overflowing the cache, thereby enabling rapid processing without the need for single block access requests to disk.

In the illustrative embodiment, a Bmap module of the storage system, such as a file server, processes the indirect blocks during file deletion by, inter alia, freeing data is blocks referenced by pointers of the L1 blocks of the file. The Bmap module accesses the L1 blocks by reading pointers contained in L2 blocks of the file. When processing an L2 block, the Bmap module reads a first portion of the block to access a first L1. The Bmap module then sends a requests to a cache controller to return the first L1 indirect block from the buffer cache. If the L1 block is not currently residing in the cache, the Bmap module (or cache controller) issues a read request to a disk controller to retrieve the next N L1 indirect blocks of the file. Thereafter, while the Bmap module processes the first L1 indirect block, the next L1 indirect blocks to be processed are loaded or are being loaded into the buffer cache. When the Bmap module completes processing of the first L1 indirect block and requests the next L1 indirect block, the cache controller forwards the preloaded indirect block from the cache module.

Advantageously, such preloading significantly improves file deletion performance as it obviates the need to perform multiple single indirect block data access requests. However, a situation may arise where there is a slight delay at the completion of processing of the N preloaded indirect blocks when the Bmap module requests the N+1st L1 indirect block, which is not preloaded into the buffer cache. As a result, a new request for the next N L1 indirect blocks must be issued to the disk controller. In an embodiment, a request for an additional N blocks may be sent to the disk controller after a predefined number of the first N blocks have been processed. This "overlapping" enhancement to the novel technique removes the slight delay that occurs at the end of each N block quantum.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
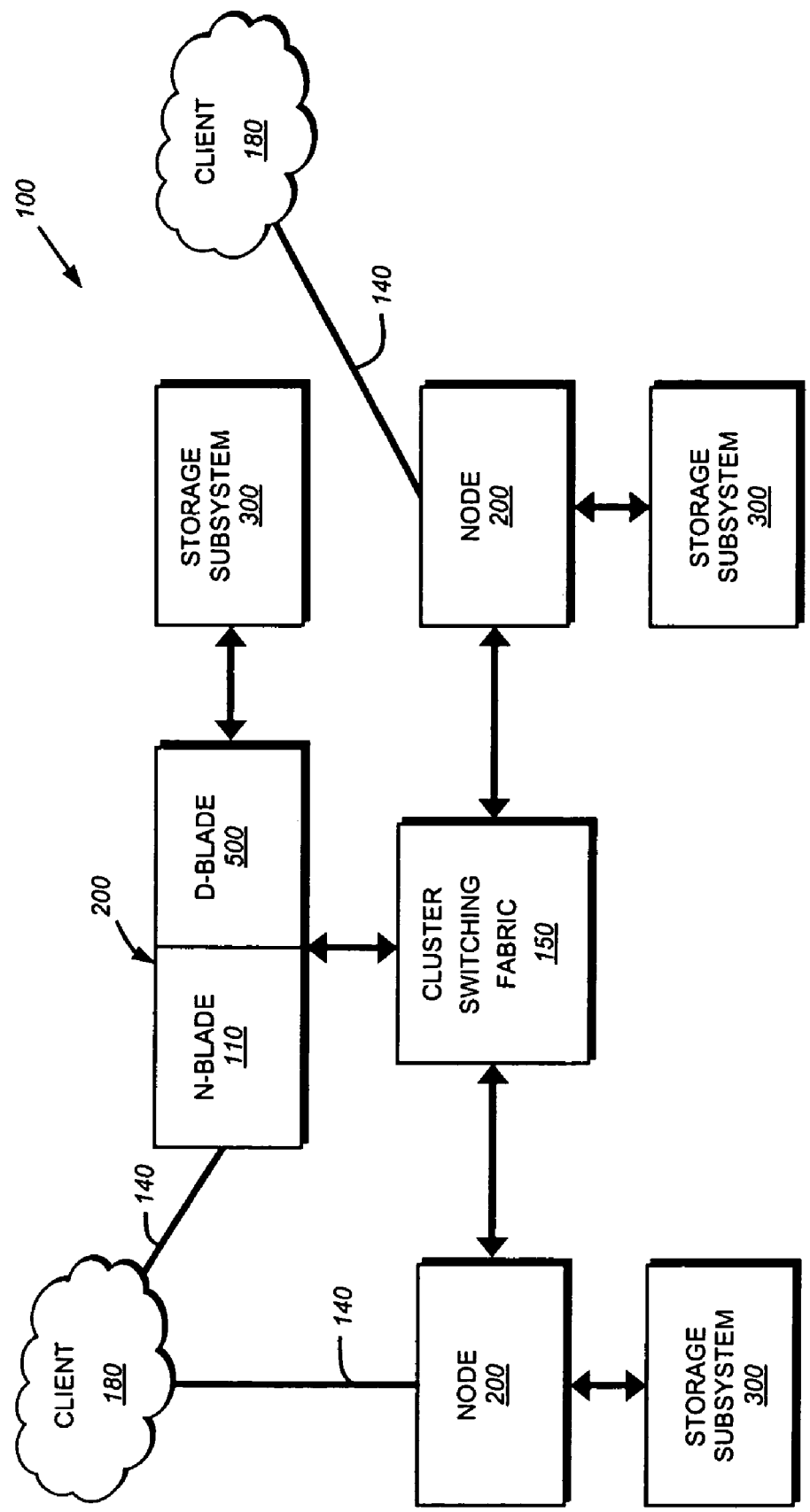
FIG. 1 is a schematic block diagram of a plurality of nodes interconnected as a cluster that may be advantageously used with the present invention.

FIG. 1 is a schematic block diagram of a plurality of nodes 200 interconnected as a cluster 100 and configured to provide storage service relating to the organization of information on storage devices of a storage subsystem. The nodes 200 comprise various functional components that cooperate to provide a distributed Spin File System (SpinFS) architecture of the cluster 100. To that end, each SpinFS node 200 is generally organized as a network element (N-blade 110) and a disk element (D-blade 500). The N-blade 110 includes a plurality of ports that couple the node 200 to clients 180 over a computer network 140, while each D-blade 500 includes a plurality of ports that connect the node to a storage subsystem 300. The nodes 200 are interconnected by a cluster switching fabric 150 which, in the illustrative embodiment, may be embodied as a Gigabit Ethernet switch. The distributed SpinFS architecture is generally described in U.S. Pat. No. 6,671,773 titled Method and System for Responding to File System Requests, by M. Kazar et al. issued Dec. 30, 2003.

B. Storage Systems

Figure 2:
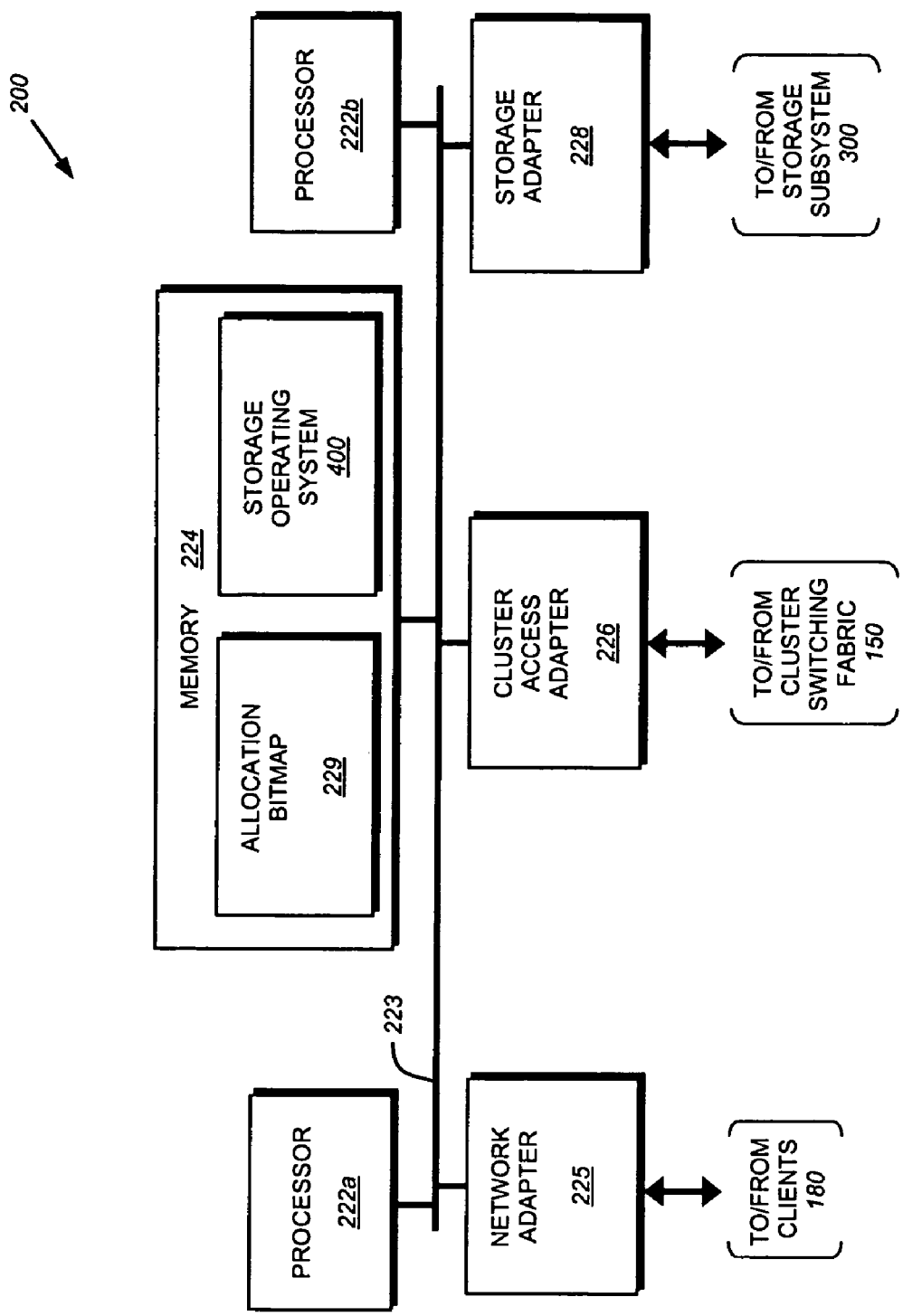
FIG. 2 is a schematic block diagram of a node that may be advantageously used with the present invention.

FIG. 2 is a schematic block diagram of a node 200 that is illustratively embodied as a storage system server comprising a plurality of processors 222, a memory 224, a network adapter 225, a cluster access adapter 226 and a storage adapter 228 interconnected by a system bus 223. The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein.

Each node 200 is illustratively embodied as a dual processor server system executing a storage operating system 400 that provides a file system configured to logically organize the information as a hierarchical structure of named directories and files on storage subsystem 300. However, it will be apparent to those of ordinary skill in the art that the node 200 may alternatively comprise a single or more than two processor system. Illustratively, one processor 222a executes the functions of the N-blade 110 on the node, while the other processor 222b executes the functions of the D-blade 500.

In the illustrative embodiment, the memory 224 comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 400, portions of which are typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the inventive system and method described herein.

The network adapter 225 comprises a plurality of ports adapted to couple the node 200 to one or more clients 180 over point-to-point links, wide area networks, virtual private networks implemented over a public network (Internet) or a shared local area network, hereinafter referred to as an Ethernet computer network 140. Therefore, the network adapter 225 may comprise a network interface card (NIC) having the mechanical, electrical and signaling circuitry needed to connect the node to the network. For such a network attached storage (NAS) based network environment, the clients are configured to access information stored on the node 200 as files. The clients 180 communicate with each node over network 140 by exchanging discrete frames or packets of data according to pre-defined protocols, such as the Transmission Control Protocol/Internet Protocol (TCP/IP).

The storage adapter 228 cooperates with the storage operating system 400 executing on the node 200 to access information requested by the clients. The information may be stored on disks or other similar media adapted to store information. The storage adapter comprises a plurality of ports having input/output (I/O) interface circuitry that couples to the disks over an I/O interconnect arrangement, such as a conventional high-performance, Fibre Channel (FC) link topology. The information is retrieved by the storage adapter and, if necessary, processed by the processor 222 (or the adapter 228 itself) prior to being forwarded over the system bus 223 to the network adapter 225 where the information is formatted into packets or messages and returned to the clients.

Figure 3:
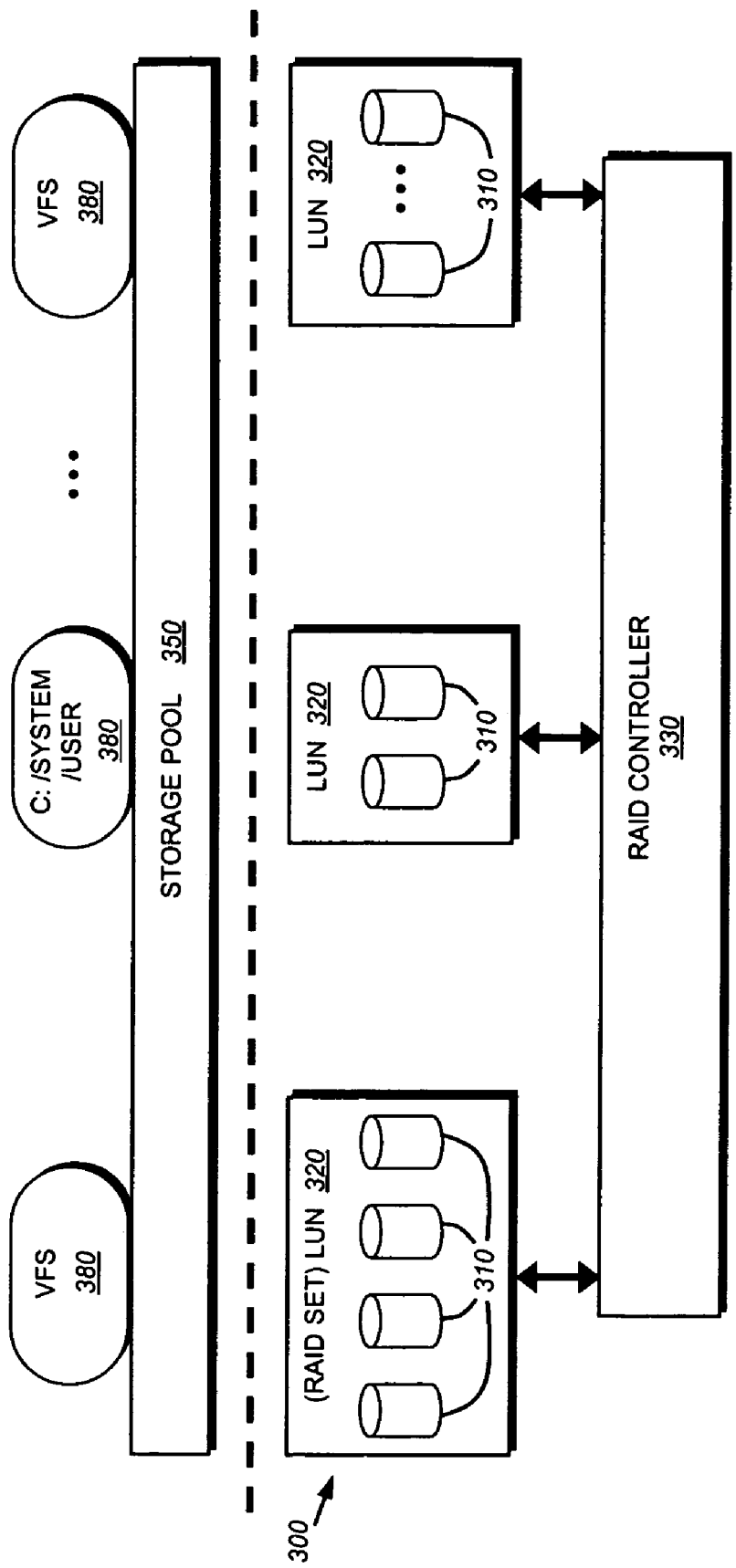
FIG. 3 is a schematic block diagram illustrating the storage subsystem that may be advantageously used with the present invention.

FIG. 3 is a schematic block diagram illustrating the storage subsystem 300 that may be advantageously used with the present invention. Storage of information on the storage subsystem 300 is illustratively implemented as a plurality of storage disks 310 defining an overall logical arrangement of disk space. The disks are further organized as one or more groups or sets of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may used in accordance with the present invention.

Each RAID set is illustratively configured by one or more disk (e.g., RAID) controllers 330. The RAID controller 330 exports a RAID set as a logical unit number (LUN 320) to the D-blade 500, which writes and reads blocks to and from the LUN 320. One or more LUNs are illustratively organized as a storage pool 350, wherein each storage pool 350 is "owned" by a D-blade 500 in the cluster 100. Each storage pool 350 is further organized as a plurality of virtual file systems (VFSs 380), each of which is also owned by the D-blade. Each VFS 380 may be organized within the storage pool according to a hierarchical policy that, among other things, allows the VFS to be dynamically moved among nodes of the cluster to, for example, control load among individual storage pools.

In the illustrative embodiment, a VFS 380 is synonymous with a volume and comprises a root directory, as well as a number of subdirectories and files. A group of VFSs may be composed into a larger namespace. For example, a root directory (c:) may be contained within a root VFS ("/"), which is the VFS that begins a translation process from a pathname associated with an incoming request to actual data (file) in a file system, such as the SpinFS file system. The root VFS may contain a directory ("system") or a mount point ("user"). A mount point is a SpinFS object used to "vector off" to another VFS and which contains the name of that vectored VFS. The file system may comprise one or more VFSs that are "stitched together" by mount point objects.

C. Storage Operating System

To facilitate access to the disks 310 and information stored thereon, the storage operating system 400 implements a write-anywhere file system, such as the SpinFS file system, which logically organizes the information as a hierarchical structure of named directories and files on the disks. However, it is expressly contemplated that any appropriate storage operating system, including a write in-place file system, may be enhanced for use in accordance with the inventive principles described herein. Each "on-disk" file may be implemented as set of disk blocks configured to store information, such as data, whereas the directory may be implemented as a specially formatted file in which names and links to other files and directories are stored.

As used herein, the term "storage operating system" generally refers to the computer-executable code operable on a computer that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 4:
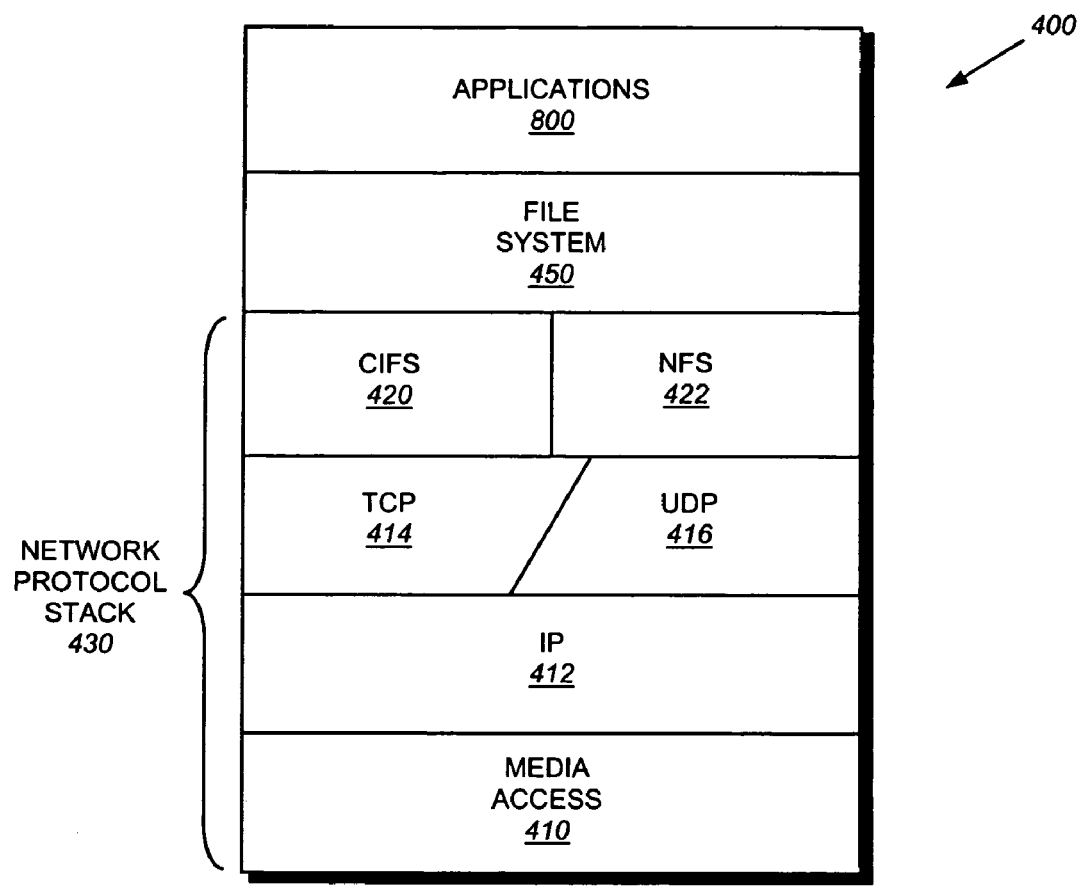
FIG. 4 is a partial schematic block diagram of a storage operating system that may be advantageously used with the present invention.

FIG. 4 is a partial schematic block diagram of the storage operating system 400 that may be advantageously used with the present invention. The storage operating system comprises a series of software layers organized to form an integrated network protocol stack 430 that provides a data path for clients to access information stored on the node 200 using file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access to a file system 450 (the SpinFS file system) and, thus, includes support for the CIFS protocol 220 and the NFS protocol 222. As described further herein, a plurality of management processes executes as user mode applications 800.

In the illustrative embodiment, the processors 222 share various resources of the node 200, including the storage operating system 400. To that end, the N-blade 110 executes the integrated network protocol stack 430 of the operating system 400 to thereby perform protocol termination with respect to a client issuing incoming NFS/CIFS file access request packets over the network 140. The NFS/CIFS layers of the network protocol stack function as NFS/CIFS servers 422, 420 that translate NFS/CIFS requests from a client into SpinFS protocol requests used for communication with the D-blade 500. The SpinFS protocol is a file system protocol that provides operations related to those operations contained within the incoming file access packets. Local communication between an N-blade and D-blade of a node is preferably effected through the use of message passing between the blades, while remote communication between an N-blade and D-blade of different nodes occurs over the cluster switching fabric 150.

D. D-Blade

Figure 5:
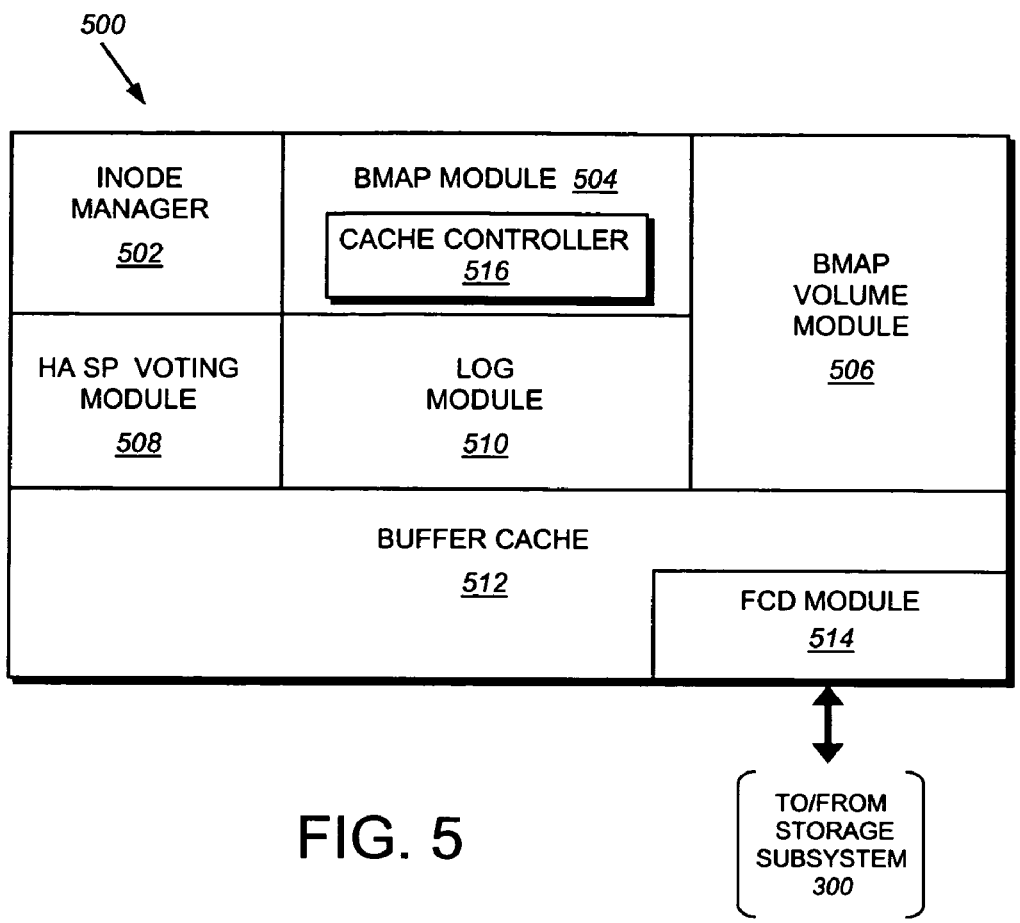
FIG. 5 is a schematic block diagram of a D-blade that may be advantageously used with the present invention.

Specifically, the NFS and CIFS servers of an N-blade 110 convert the incoming file access requests into SpinFS requests that are processed by the D-blades 500 of the cluster 100. Each D-blade 500 provides a disk interface function through execution of the SpinFS file system 450. In the illustrative cluster 100, the file systems 450 cooperate to provide a single SpinFS file system image across all of the D-blades in the cluster. Thus, any network port of an N-blade that receives a client request can access any file within the single file system image located on any D-blade 500 of the cluster. FIG. 5 is a schematic block diagram of the D-blade 500 comprising a plurality of functional components including a file system processing module (the inode manager 502), a logical-oriented block processing module (the Bmap module 504) and a Bmap volume module 506. The inode manager 502 is the processing module that implements the SpinFS file system 450, whereas the Bmap module 504 is responsible for all block allocation functions associated with a write anywhere policy of the file system 450, including reading and writing all data to and from the RAID controller 330 of storage subsystem 300. The Bmap volume module 506, on the other hand, implements all VFS operations in the cluster 100, including creating and deleting a VFS, mounting and unmounting a VFS in the cluster, moving a VFS, as well as cloning (snapshotting) and mirroring a VFS. The D-blade also includes a high availability storage pool (HA SP) voting module 508, a log module 510, a buffer cache 512 and a fibre channel device driver (FCD) module.

E. SpinFS

Figure 6:
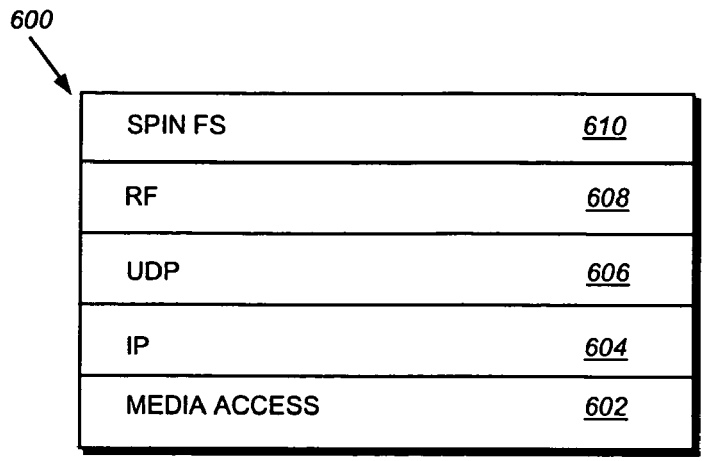
FIG. 6 is a schematic block diagram illustrating the format of a SpinFS request that may be advantageously used with the present invention.

The NFS and CIFS servers on the N-blade 110 translate respective NFS and CIFS requests into SpinFS primitive operations contained within SpinFS packets (requests). FIG. 6 is a schematic block diagram illustrating the format of a SpinFS request 600 that illustratively includes a media access layer 602, an IP layer 604, a UDP layer 606, an RF layer 608 and a SpinFS protocol layer 610. As noted, the SpinFS protocol 610 is a file system protocol that provides operations, related to those operations contained within incoming file access packets, to access files stored on the cluster 100. Illustratively, the SpinFS protocol 610 is datagram based and, as such, involves transmission of packets or "envelopes" in a reliable manner from a source (e.g., an N-blade) to a destination (e.g., a D-blade). The RF layer 608 implements a reliable transport protocol that is adapted to process such envelopes in accordance with a connectionless protocol, such as UDP 606.

Figure 7:
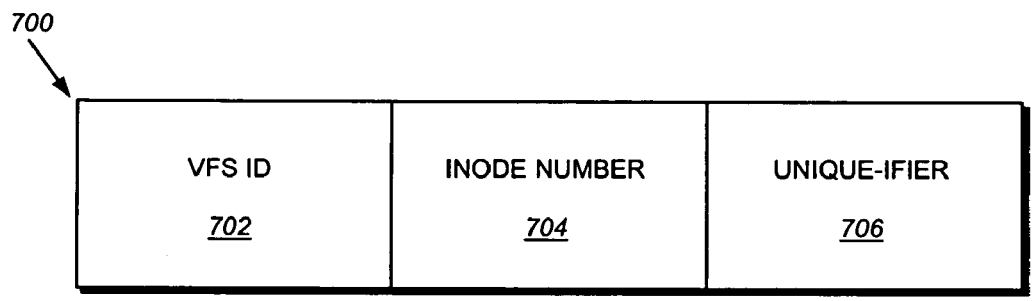
FIG. 7 is a schematic block diagram illustrating the format of a file handle that may be advantageously used with the present invention.

Files are accessed in the SpinFS file system 450 using a file handle. FIG. 7 is a schematic block diagram illustrating the format of a file handle 700 including a VFS ID field 702, an inode number field 704 and a unique-ifier field 706. The VFS ID field 702 is contains an identifier of a VFS that is unique (global) within the entire cluster 100. The inode number field 704 contains an inode number of a particular inode within an inode file of a particular VFS. The unique-ifier field 706 contains a monotonically increasing number that uniquely identifies the file handle 700, particularly in the case where an inode number has been deleted, reused and reassigned to a new file. The unique-ifier distinguishes that reused inode number in a particular VFS from a potentially previous use of those fields.

Figure 8:
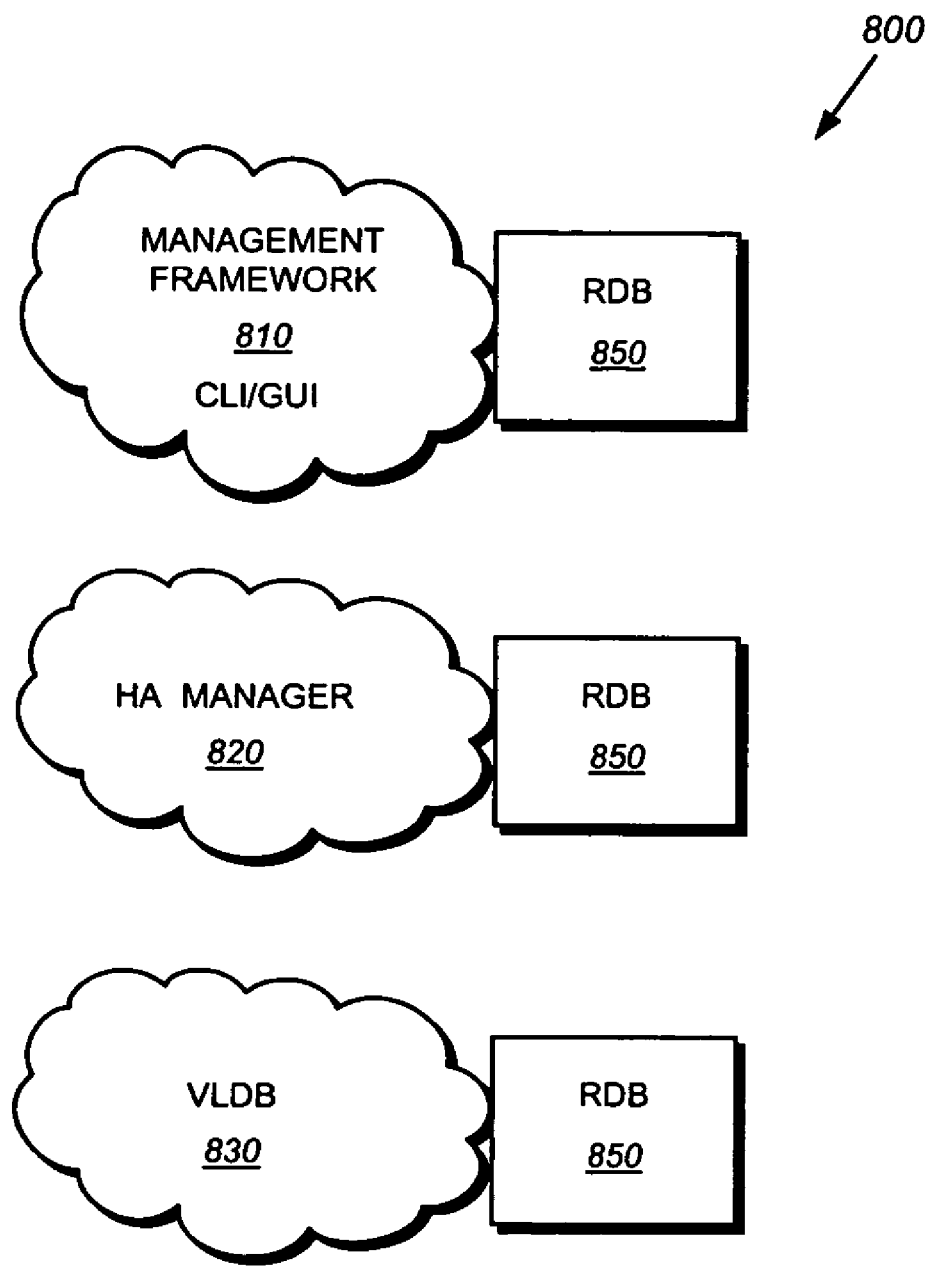
FIG. 8 is a schematic block diagram illustrating a collection of management processes that may be advantageously used with the present invention.

FIG. 8 is a schematic block diagram illustrating a collection of management processes that execute as user mode applications 800 on the storage operating system 400 to provide management of configuration information (i.e. management data) for the nodes of the cluster. To that end, the management processes include a management framework process 810, a high availability manager (HA Mgr) process 820, a VFS location database (VLDB) process 830 and a replicated database (RDB) process 850. The management framework 810 provides a user interface via a command line interface (CLI) and/or graphical user interface (GUI). The management framework is illustratively based on a conventional common interface model (CIM) object manager that provides the entity to which users/system administrators interact with a node 200 in order to manage the cluster 100.

The HA Mgr 820 manages all network addresses (IP addresses) of all nodes 200 on a cluster-wide basis. For example, assume a network adapter 225 having two IP addresses (IP1 and IP2) on a node fails. The HA Mgr 820 relocates those two IP addresses onto another N-blade of a node within the cluster to thereby enable clients to transparently survive the failure of an adapter (interface) on an N-blade 110. The relocation (repositioning) of IP addresses within the cluster is dependent upon configuration information provided by a system administrator. The HA Mgr 820 is also responsible for functions such as monitoring an uninterrupted power supply (UPS) and notifying the D-blade to write its data to persistent storage when a power supply issue arises within the cluster.

The VLDB 830 is a database process that tracks the locations of various storage components (e.g., a VFS) within the cluster 100 to thereby facilitate routing of requests throughout the cluster. In the illustrative embodiment, the N-blade 110 of each node has a look up table that maps the VFS ID 702 of a file handle 700 to a D-blade 500 that "owns" (is running) the VFS 380 within the cluster. The VLDB provides the contents of the look up table by, among other things, keeping track of the locations of the VFSs 380 within the cluster. The VLDB has a remote procedure call (RPC) interface, e.g., a Sun RPC interface, which allows the N-blade 110 to query the VLDB 830. When encountering a VFS ID 702 that is not stored in its mapping table, the N-blade sends an RPC to the VLDB process. In response, the VLDB 830 returns to the N-blade the appropriate mapping information, including an identifier of the D-blade that owns the VFS. The N-blade caches the information in its look up table and uses the D-blade ID to forward the incoming request to the appropriate VFS 380.

All of these management processes have interfaces to (are closely coupled to) a replicated database (RDB) 850. The RDB comprises a library that provides a persistent object store (storing of objects) for the management data processed by the management processes. Notably, the RDB 850 replicates and synchronizes the management data object store access across all nodes 200 of the cluster 100 to thereby ensure that the RDB database is identical (has an identical image) on all of the nodes 200. For example, the HA Mgr 820 uses the RDB library 850 to monitor the status of the IP addresses within the cluster. At system startup, each node 200 records the status/state of its interfaces and IP addresses (those IP addresses it "owns") into the RDB database.

Operationally, requests are issued by clients 180 and received at the network protocol stack 430 of an N-blade 110 within a node 200 of the cluster 100. The request is parsed through the network protocol stack to the appropriate NFS/CIFS server, where the specified VFS 380 (and file), along with the appropriate D-blade 500 that "owns" that VFS, are determined. The appropriate server then translates the incoming request into a SpinFS request 600 that is routed to the D-blade 500. The D-blade receives the SpinFS request and apportions it into a part that is relevant to the requested file (for use by the inode manager 502), as well as a part that is relevant to specific access (read/write) allocation with respect to blocks on the disk (for use by the Bmap module 504). All functions and interactions between the N-blade 110 and D-blade 500 are coordinated on a cluster-wide basis through the collection of management processes and the RDB library user mode applications 800.

Figure 9:
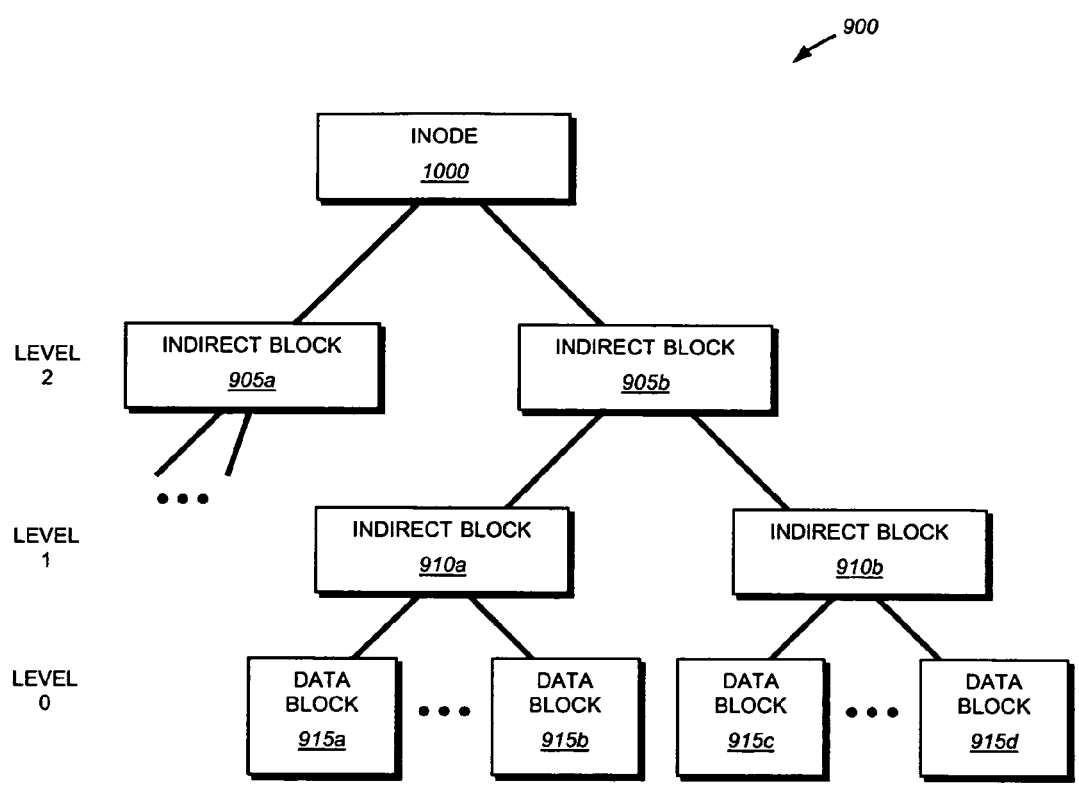
FIG. 9 is a schematic block diagram illustrating a buffer tree in accordance with an embodiment of the present invention.

FIG. 9 is a schematic block diagram of an exemplary buffer tree 900 of a file. At the top of the buffer tree of the file is an inode 1000, which may be stored within an inode file of the file system. Inode files are further described in U.S. patent application Ser. No. 10/777,979 filed on Feb. 12, 2004 now issued as U.S. Pat. No. 7,313,720 issued Dec. 25, 2007, entitled TECHNIQUE FOR INCREASING THE NUMBER OF PERSISTENT CONSISTENCY POINT IMAGES IN A FILE SYSTEM, by Emily Eng, et al. The inode contains a series of pointers to high-level indirect blocks 905a,b, which in turn contain pointers to additional low-level indirect blocks 910a,b. At the base of the file are individual data blocks 915a-d. Each data block illustratively represents a 4 KB on-disk block. The data blocks are labeled as direct or level 0 (L0) blocks 915, whereas indirect blocks that point directly to data blocks are labeled as level 1 (L1) blocks 910. Similarly, indirect blocks that point to L1 blocks are level 2 (L2) blocks 905. Buffer tree 900 is illustratively representative of a file having an inode and two levels of indirect blocks, L1 and L2, pointing to direct blocks; however, it should be noted that the principle of the present invention applies to files having any number of indirect blocks. Two levels of indirect blocks are shown for illustrative purposes only and should not be taken as limiting the present invention.

Figure 10:
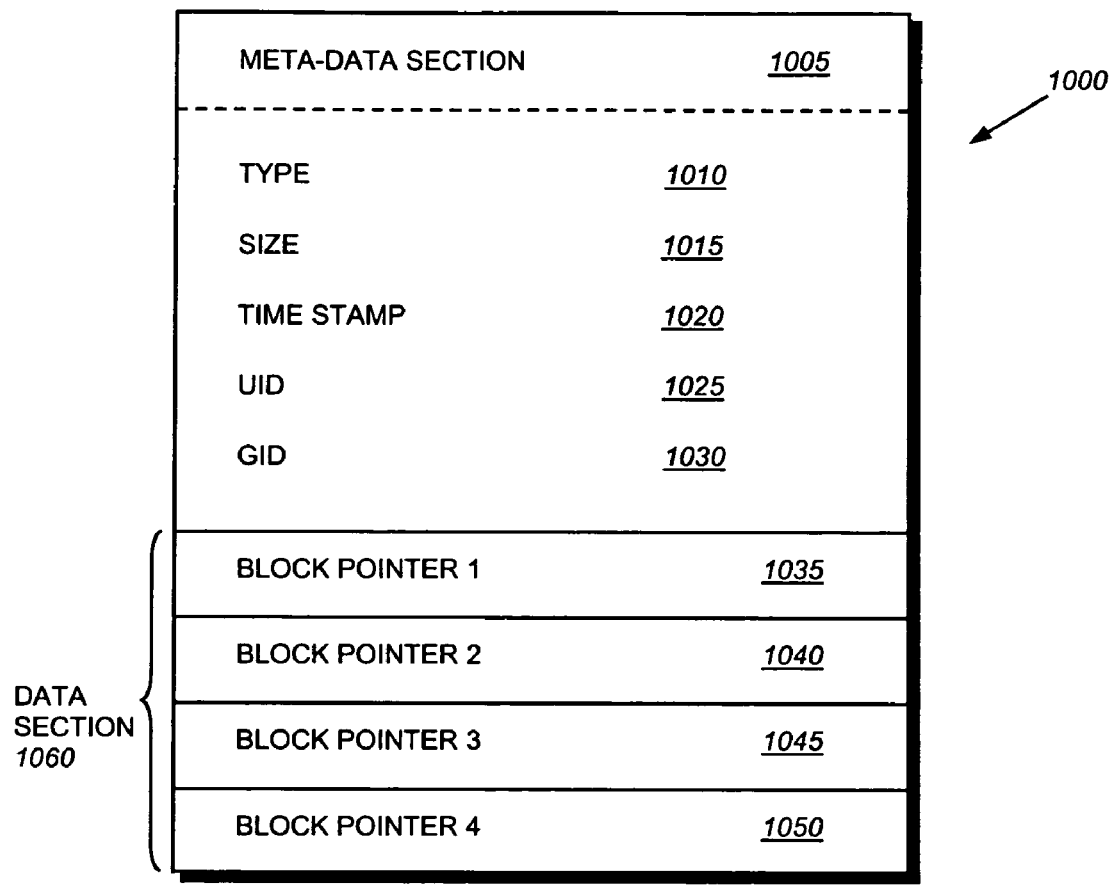
FIG. 10 is a schematic block diagram illustrating an illustrative inode in accordance with an embodiment of the present invention.

FIG. 10 is an exemplary inode 1000 data structure according to an embodiment of the present invention. The inode 1000 includes a meta-data section 1005 and a data section 1060 that illustratively starts a series of disk block pointers 1035, 1040, 1045, 1050. In the illustrative embodiment, a file is represented in the write-anywhere file system by an inode data structure adapted for storage on the disks 310. The information stored in the metadata section 1005 describes the file and, as such, includes the type (e.g., regular, directory, virtual disk) 1010 of file, the size 1015 of the file, time stamps (e.g., access and/or modification) 1020 for the file and ownership, i.e., user identifier (UID 1025) and group ID (GID 1030), of the file.

The disk block pointers 1035, 1040, 1045, 1050 contain pointers to direct or indirect blocks of a buffer tree for the file represented by the inode. In the illustrative embodiment, pointer 1035 points to a direct block, pointer 1040 points to a L1 indirect block, pointer 1045 points to a L2 indirect block and pointer 1050 points to a L6 indirect block. However, in alternate embodiments, each of the pointers 1035, 1040, 1045, 1050 may point to any level of indirect or direct block, depending on the size of the file associated with the inode.

F. Accelerating File Deletion by Preloading Indirect Blocks

The present invention is directed to a technique that accelerates file deletion of a file (preferably a large file) by preloading indirect blocks of the file stored by a storage system, such as node 200 having an inode-based file system 450. In particular, the technique accelerates traversal of buffer tree 900 of the file during file deletion by preloading a predefined number (N) of low-level (L1) indirect blocks referenced by a high-level (L2) indirect block into buffer cache 512 before those L1 blocks are needed for processing. The value of N is preferably chosen to ensure that all preloaded indirect blocks may be stored in the buffer cache without overflowing the cache. Illustratively, 128 L1 blocks are loaded into the cache at a time. Once loaded, the L1 indirect blocks are temporarily stored (cached) until requested for processing. Preloading of the indirect blocks thereby obviates the need to perform a plurality of single block access requests to disk.

In the illustrative embodiment, a Bmap module of the storage system, such as a file server, processes the indirect blocks during file deletion by, inter alia, freeing data blocks referenced by pointers of the L1 blocks of the file. The Bmap module accesses the L1 blocks by reading pointers contained in L2 blocks of the file. When processing an L2 block, the Bmap module reads a first portion of the block to access a first L1. The Bmap module then sends a request to a cache controller to return the first L1 indirect block from the buffer cache. If the L1 block is not currently residing in the cache, the Bmap module (or cache controller) issues a read request to a disk controller to retrieve the next N L1 indirect blocks of the file. Thereafter, while the Bmap module processes the first L1 indirect block, the next L1 indirect blocks to be processed are loaded or are being loaded into the buffer cache. When the Bmap module completes processing of the first L1 indirect block and requests the next L1 indirect block, the cache controller forwards the preloaded indirect block from the cache module. Advantageously, such pre-loading significantly improves file deletion performance as it obviates the need to perform multiple single indirect block data access requests.

Figure 11:
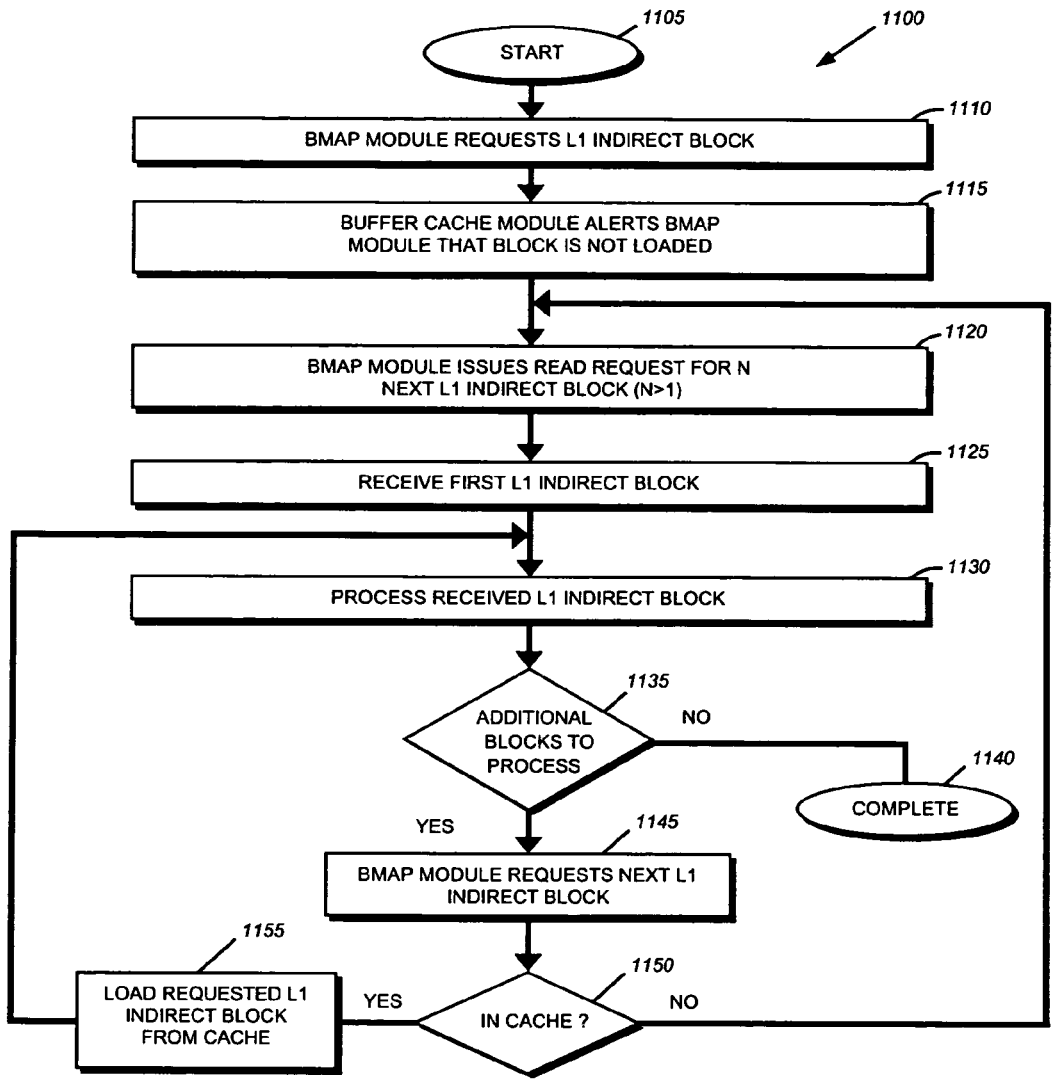
FIG. 11 is a flow chart detailing the steps of a procedure for preloading indirect blocks in accordance with an embodiment of the present invention.

FIG. 11 is a flowchart detailing the steps of a procedure 1100 for preloading indirect blocks of a large file in accordance with an embodiment of the present invention. The procedure 1100 is invoked during a file deletion operation. The procedure begins in step 1105 and continues to step 1110 where the Bmap module sends a request to a cache controller 516 for a L1 indirect block to process. The Bmap 504 may request a L1 indirect block while it is currently processing a L2 indirect block that references a plurality of L1 blocks. Alternately, if the file size is of an appropriate size, the inode may directly reference a plurality of L1 blocks. In step 1115, the cache controller 516 alerts the Bmap module that the block is not resident in the buffer cache 512. In response, the Bmap module (or cache controller) issues a read request to the disk controller 330 for the next N L1 indirect blocks from disk. In the illustrative embodiment, N=128, however the value of N may vary depending on a variety of factors including the size of the buffer cache and the size of indirect blocks in the file system. The value of N is illustratively set so that the N indirect blocks do not cause the buffer cache to overflow, thereby requiring additional read operations. In alternate embodiments, the value of N may vary dynamically based on the amount of available buffer cache memory, i.e., N is proportional to the amount of free buffer cache.

The RAID controller returns the requested blocks and forwards them to the cache controller, which loads the next N L1 indirect blocks into the buffer cache. Then, in step 1125, the Bmap module receives the first requested L1 indirect block from the buffer cache. It should be noted that the N indirect blocks may not arrive simultaneously into the buffer cache; however, the RAID controller 310 of the storage subsystem 300 may be processing the disk access request for the N indirect blocks while other modules of the D-blade are processing the received indirect blocks, thereby creating, in effect, a parallel processing system that improves system performance and reduces the time required for large file deletion.

The Bmap module then processes the received L1 indirect block (step 1130) using conventional file deletion techniques, i.e., clearing bits corresponding to data blocks referenced by pointers in the L1 block. In the illustrative embodiment, the bits are stored in an allocation bitmap structure 229 maintained by the Bmap module 504. Using the bitmap 229, the Bmap 504 "frees" a block by clearing a corresponding bit in the bitmap 229. Once the received L1 indirect block has been processed, the file system determines, in step 1135, if there are additional blocks to be processed. If there are no further L1 indirect blocks to be processed, then the procedure branches to step 1140 and completes. Otherwise, the procedure continues to step 1145 where the Bmap module requests the next L1 indirect block. A determination is made in step 1150 if the requested block has been loaded in the buffer cache. If the requested L1 indirect block is located in the buffer cache, then the procedure branches to step 1155 where the requested L1 indirect block is loaded from the buffer cache to the Bmap module before returning to step 1130.

However, if the requested L1 indirect block is not in the buffer cache, then the procedure returns to step 1120 and where the next N L1 indirect blocks are loaded into the buffer cache. This will occur when, e.g., the Bmap module has processed all N of the previously loaded blocks, which may result in a slight performance delay at the end of each N blocks. However, as the N indirect blocks were loaded in a single operation instead of in N disk operations, a significant improvement in system performance is achieved.

Figure 12:
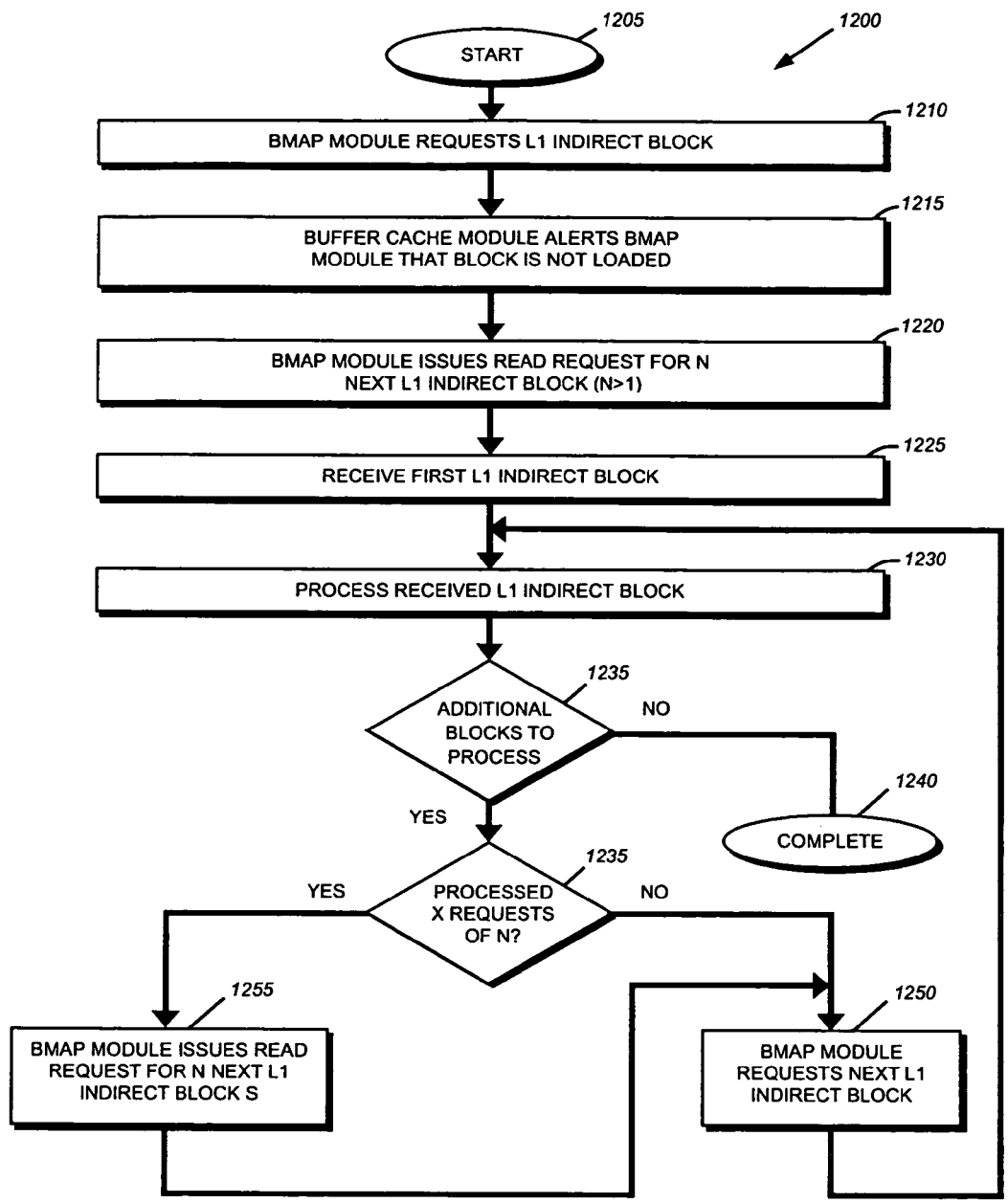
FIG. 12 is a schematic block diagram of an exemplary procedure for preloading indirect blocks in accordance with an alternate embodiment of the present invention.

FIG. 12 is a flowchart of a procedure 1200 for preloading indirect blocks in accordance with an alternate embodiment of the present invention that eliminates the performance delay at the end of every N blocks. The procedure begins in step 1205 and continues to step 1210 where the Bmap module requests a L1 indirect block from the buffer cache and the cache controller alerts the Bmap module that the block is not loaded into the buffer cache (step 1215). In response, the Bmap module (or cache controller) issues a read request (step 1220) to the RAID controller 330 for the next N L1 indirect blocks. This read request results in the next N indirect blocks being loaded into the buffer cache. The Bmap module receives the first L1 indirect block in step 1225 and processes the L1 indirect block in step 1230. Once the block is processed, the procedure determines if there are additional blocks to process in step 1235. If there are no further L1 indirect blocks to process, the procedure branches to step 1240 and is complete. Otherwise, the procedure continues to step 1235 where the procedure determines if it has processed at least X of the N L1 indirect blocks. The value of X is set to an appropriate level so that a request for an additional N blocks will not overflow the buffer cache.

If X indirect blocks have been processed, the procedure branches to step 1255 where the Bmap module (or cache controller) issues a read request for an additional N L1 indirect blocks. In yet another alternate embodiment, the Bmap module requests an additional Y L1 indirect blocks, wherein Y does not equal N. This may occur when, for example, requesting an additional N blocks would cause the buffer cache to overflow, thereby resulting in additional read requests. The selection of N, X, and Y is configurable by an administrator to optimize the performance of the file system depending on the specific implementation. Once the additional L1 indirect blocks have been requested the procedure continues to step 1250 where the Bmap module request the next L1 indirect block before returning to step 1230.

Advantageously, this alternate embodiment "smooths" the flow of indirect blocks into the buffer cache compared to the illustrative embodiment, which may have an interrupt after each N blocks. As noted, the values of N, X and Y may be chosen to achieve the best performance depending on the specifics of the file system implementing the teachings of the present invention.

To again summarize, the present invention provides a technique for accelerating file deletion by preloading L1 indirect blocks. In the illustrative embodiment, a Bmap module of the storage system, such as a file server, processes the indirect blocks during file deletion by, inter alia, freeing data blocks references by pointers of the L1 blocks of the file. The Bmap module accesses the L1 blocks by reading pointers contained in L2 blocks of the file. When processing an L2 block, the Bmap module reads a first portion of the block to access a first L1. The Bmap module then sends a requests to a cache controller to return the first L1 indirect block from the buffer cache. If the L1 block is not currently residing in the cache, the Bmap module (or cache controller) issues a read request to a disk controller to retrieve the next N L1 indirect blocks of the file. Thereafter, while the Bmap module processes the first L1 indirect block, the next L1 indirect blocks to be processed are loaded or are being loaded into the buffer cache. When the Bmap module completes processing of the first L1 indirect block and requests the next L1 indirect block, the cache controller forwards the preloaded indirect block from the cache module. Advantageously, such preloading significantly improves file deletion performance as it obviates the need to perform multiple single indirect block data access requests. In an alternate embodiment, once X of the N indirect blocks have been processed, a read request is issued for an additional N indirect blocks from disk, thereby eliminating the slight delay that occurs between processing the Nth and $N+1^{st}$ indirect block in the illustrative embodiment.

The foregoing description has been directed to particular embodiments of this invention. It will be apparent, however, that other variations and modifications may be made to the described embodiments, with the attainment of some or all of their advantages. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for accelerating file deletion of a file served by a storage system, comprising:
    invoking a file deletion operation to delete a selected file;
    reading, in response to the file deletion operation, a high-level indirect block of a buffer tree of the selected file to locate one or more low-level indirect blocks referenced by the high-level indirect block;
    issuing read requests, in response to locating the one or more low-level indirect blocks, for the one or more low-level indirect blocks;
    processing a first low-level indirect block of the one or more low-level indirect blocks in parallel with executing the read requests;
    preloading into a buffer cache memory a number of one or more low-level indirect blocks that were read while the first low-level block is being processed, wherein the number, of the one or more low-level indirect blocks to be preloaded, chosen to ensure that the one or more low-level indirect blocks do not overflow the buffer cache memory; and
    freeing data blocks referenced by pointers of the first low-level indirect block in response to the file deletion operation to delete the data blocks.

2. The method of claim 1, further comprising:
    processing, by the storage system, the low-level indirect blocks referenced by the high-level indirect block.

3. The method of claim 1, further comprising:
    preloading the one or more low-level indirect blocks referenced by the high-level indirect block into the buffer cache of the storage system before the one or more low-level indirect blocks are needed for processing.

4. The method of claim 1, further comprising:
    processing the first low-level indirect block by clearing a set of pointers in the first low level indirect block.

5. The method of claim 1, further comprising:
    representing each low-level indirect block as a 4 KB block.

6. A storage system, comprising:
    an operating system having a file deletion operation;
    in response to the file deletion operation, reading a high-level indirect block of a buffer tree of a selected file to locate one or more low-level indirect blocks referenced by the high-level indirect blocks;
    read requests to be issued in response to locating the one or more low-level indirect blocks;
    a first low-level indirect block of the one or more low-level indirect blocks to be processed in parallel to executing the read requests;
    a number of one or more low-level indirect blocks that were read to be preloaded into a buffer cache memory while the first low level indirect block is being processed, wherein the number, of the one or more low-level indirect blocks to be preloaded, chosen to ensure that the one or more low-level indirect blocks do not overflow the buffer cache memory; and
    data blocks referenced by pointers of the first low-level indirect block are freed in response to the file deletion operation to delete the data blocks.

7. The system of claim 6, further comprising:
    the one or more low-level indirect blocks referenced by the high-level indirect block are processed by the storage system.

8. The system of claim 6, further comprising:
    the first low-level indirect block is processed by clearing a set of pointers in the first low level indirect block.

9. The system of claim 6, further comprising:
    each low-level indirect block represented as a 4 KB block.

10. A computer readable media, comprising:
    said computer readable media containing instructions for execution on a processor for a method of accelerated file deletion of a file served by a storage system, the method having;
    invoking a file deletion operation to delete a selected file;
    reading, in response to the file deletion operation, a high-level indirect block of a buffer tree of the selected file to locate one or more low-level indirect blocks referenced by the high-level indirect block;
    issuing read requests, in response to locating the one or more low-level indirect blocks, for the one or more low-level indirect blocks;
    processing a first low-level indirect block of the one or more low-level indirect blocks in parallel to executing the read requests;
    preloading into a buffer cache memory a number of one or more low-level indirect blocks that were read while the first low-level indirect block is being processed, wherein the number, of the one or more low-level indirect blocks to be preloaded, chosen to ensure that the one or more low-level indirect blocks do not overflow the buffer cache memory; and
    freeing data blocks referenced by pointers of the first low-level indirect block in response to the file deletion operation to delete the data blocks.

* * * * *

UNITED STATES PATENT AND TRADEMARK OFFICE
CERTIFICATE OF CORRECTION

| | | |
|---|---|---|
| PATENT NO. | : 7,509,329 B1 | Page 1 of 1 |
| APPLICATION NO. | : 10/858492 | |
| DATED | : March 24, 2009 | |
| INVENTOR(S) | : Bruce W. Leverett | |

It is certified that error appears in the above-identified patent and that said Letters Patent is hereby corrected as shown below:

In Col. 3, line 47 should read:
    blocks during file deletion by, inter alia, freeing data ~~is~~ blocks In Col. 4, line 5 should read:
    disk controller. In an <u>alternate</u> embodiment, a request for an additional Signed and Sealed this
Twenty-ninth Day of May, 2012

David J. Kappos
*Director of the United States Patent and Trademark Office*